(12) United States Patent
Lee et al.

(10) Patent No.: US 11,432,389 B2
(45) Date of Patent: Aug. 30, 2022

(54) ELECTRONIC DEVICE FOR PROVIDING VISUAL EFFECT BASED ON LOCATION OF USER BY USING LIGHT-EMITTING DEVICE AND METHOD THEREOF

(71) Applicant: SAMSUNG ELECTRONICS CO., LTD., Suwon-si (KR)

(72) Inventors: Youngbae Lee, Suwon-si (KR); Minwook Kim, Suwon-si (KR); Taekyun Kim, Suwon-si (KR); Wuseong Lee, Suwon-si (KR); Seungnyun Kim, Suwon-si (KR); Yongsang Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/256,460

(22) PCT Filed: Jan. 21, 2019

(86) PCT No.: PCT/KR2019/000822
§ 371 (c)(1),
(2) Date: Dec. 28, 2020

(87) PCT Pub. No.: WO2020/004758
PCT Pub. Date: Jan. 2, 2020

(65) Prior Publication Data
US 2021/0378073 A1 Dec. 2, 2021

(30) Foreign Application Priority Data

Jun. 25, 2018 (KR) .................. 10-2018-0072572

(51) Int. Cl.
*H05B 47/115* (2020.01)
*H05B 45/10* (2020.01)
*H05B 45/20* (2020.01)

(52) U.S. Cl.
CPC ........... *H05B 47/115* (2020.01); *H05B 45/10* (2020.01); *H05B 45/20* (2020.01)

(58) Field of Classification Search
CPC ........ H05B 45/10; H05B 45/20; H05B 47/10; H05B 47/115
See application file for complete search history.

(56) References Cited

U.S. PATENT DOCUMENTS 9,220,147 B2 12/2015 Newton et al.
9,609,722 B2 3/2017 Law
(Continued)

FOREIGN PATENT DOCUMENTS

EP 3 133 903 2/2017
JP 2008-310397 12/2008
(Continued)

OTHER PUBLICATIONS

Extended European Search Report dated Jul. 12, 2021 in EP Application No. 19826842.7.
(Continued)

*Primary Examiner* — Abdullah A Riyami
*Assistant Examiner* — Syed M Kaiser
(74) *Attorney, Agent, or Firm* — Nixon & Vanderhye, P.C.

(57) ABSTRACT

Disclosed is an electronic device including a housing, a plurality of output devices which are visually exposed through a part of the housing and are disposed at different positions, at least one sensor which is positioned in the housing and disposed at a position adjacent to the positions at which the plurality of output devices are disposed, and a processor. The electronic device may obtain a plurality of first distance values between the plurality of output devices and an object using the at least one sensor, output light through at least one first output device selected from among (Continued)

the plurality of output devices, based on at least one first distance value belonging to values in a first specified range among the plurality of first distance values, obtain a plurality of second distance values between the plurality of output devices and the object using the at least one sensor, and output light through at least one second output device selected from among the plurality of output devices, based on at least one second distance value belonging to values in a second specified range among the plurality of second distance values. In addition, various embodiments understood from the specification are possible.

13 Claims, 16 Drawing Sheets

(56) References Cited

U.S. PATENT DOCUMENTS

| | | | |
|---|---|---|---|
| 9,655,193 | B2 | 5/2017 | Knaapen et al. |
| 9,781,812 | B2 | 10/2017 | Kataoka et al. |
| 9,795,009 | B2 | 10/2017 | Law |
| 10,373,357 | B2 | 8/2019 | Woo et al. |
| 2004/0160199 | A1* | 8/2004 | Morgan .................. A01M 1/04 315/312 |
| 2005/0116667 | A1* | 6/2005 | Mueller .................. G09F 19/22 315/312 |
| 2014/0354179 | A1 | 12/2014 | Newton et al. |
| 2016/0131912 | A1* | 5/2016 | Border ................ G02B 5/3025 345/8 |
| 2016/0300374 | A1 | 10/2016 | Woo et al. |
| 2016/0338166 | A1 | 11/2016 | Knaapen et al. |
| 2017/0055328 | A1 | 2/2017 | Law |
| 2017/0099716 | A1 | 4/2017 | Kataoka et al. |
| 2017/0164451 | A1 | 6/2017 | Law |
| 2017/0181241 | A1* | 6/2017 | Koo ....................... H05B 45/22 |
| 2018/0275501 | A1* | 9/2018 | Takeshita ............... H05B 47/11 |

FOREIGN PATENT DOCUMENTS

| | | | | |
|---|---|---|---|---|
| JP | 2017-73256 | | 4/2017 | |
| JP | 2017073256 | A * | 4/2017 | ............ G06F 3/017 |
| KR | 10-1019745 | | 3/2011 | |
| KR | 10-2013-0015103 | | 2/2013 | |
| KR | 10-2013-0074887 | | 7/2013 | |
| KR | 10-1312984 | | 10/2013 | |
| KR | 101312984 | B1 * | 10/2013 | |
| KR | 10-1393709 | | 5/2014 | |
| KR | 10-2015-0134447 | | 12/2015 | |
| KR | 10-2015-0144140 | | 12/2015 | |
| KR | 10-2016-0049415 | | 5/2016 | |
| KR | 10-2016-0121287 | | 10/2016 | |
| WO | 2013-084158 | | 6/2013 | |
| WO | WO-2013084158 | A1 * | 6/2013 | ............ H05B 45/10 |
| WO | 2015-104622 | | 7/2015 | |

OTHER PUBLICATIONS

International Search Report for PCT/KR2019/000822 dated May 10, 2019, 5 pages.
Written Opinion of the ISA for PCT/KR2019/000822 dated May 10, 2019, 4 pages.

* cited by examiner

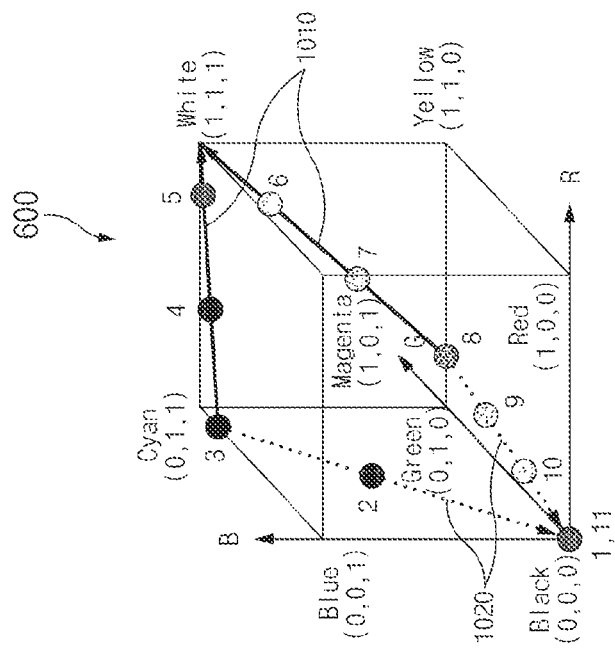
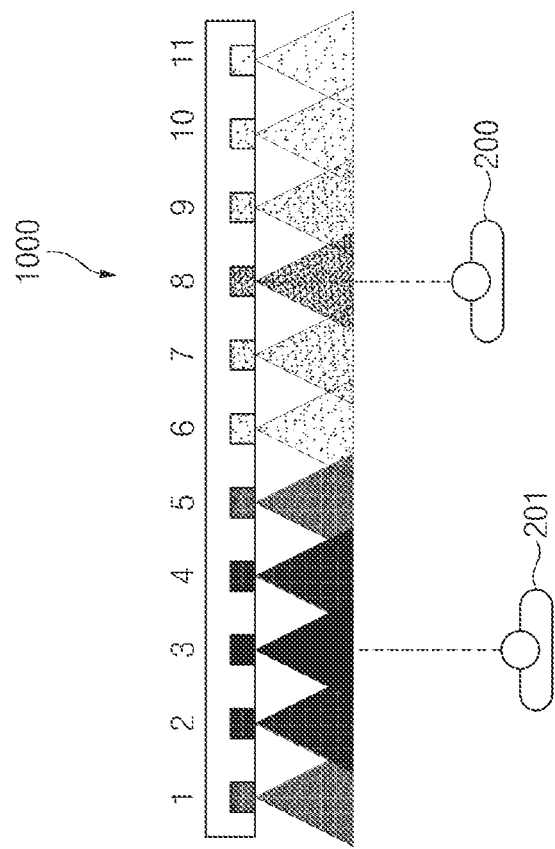
FIG.10

ELECTRONIC DEVICE FOR PROVIDING VISUAL EFFECT BASED ON LOCATION OF USER BY USING LIGHT-EMITTING DEVICE AND METHOD THEREOF

This application is the U.S. national phase of International Application No. PCT/KR2019/000822 filed Jan. 21, 2019 which designated the U.S. and claims priority to KR Patent Application No. 10-2018-0072572 filed Jun. 25, 2018, the entire contents of each of which are hereby incorporated by reference.

FIELD

Various embodiments disclosed herein relate to an electronic device for providing a visual effect using a light emitting device based on a user's position and a method thereof.

DESCRIPTION OF RELATED ART

Recently, with application of artificial intelligence (AI) technology to various electronic devices, users can receive information that users want through electronic devices, regardless of time and place. For example, the users may search for information through a portable device such as a smartphone while on the road and search for information through an electronic device installed in an indoor space such as a home or office.

With the development of the data processing speed and communication technology of an electronic device, a time taken for the electronic device to respond to a user input requesting information is gradually decreasing. As a response time to the user input decreases, the electronic device may provide a user experience (UX) such as the user's interaction with the electronic device to the user.

SUMMARY

An electronic device disposed in an indoor space may frequently operate in a fixed position away from a user. When the electronic device does not react even though the user of the electronic device enters within a predetermined distance, the user may not know whether the electronic device is operating, and therefore, there is a need that the electronic device measures the user's position and provides information according to the measured position.

According an embodiment disclosed herein, an electronic device may include a housing, a plurality of output devices which are visually exposed through a portion of the housing and disposed at different positions, at least one sensor positioned in the housing and disposed at a position adjacent to the positions at which the plurality of output devices are disposed and, a processor positioned in the housing and operatively connected to the plurality of output devices and the at least one sensor, wherein the processor may obtain a plurality of first distance values between the plurality of output devices and an object through a first signal output using the at least one sensor, output light through at least one first output device selected from among the plurality of output devices, based on at least one first distance value belonging to values in a first specified range among the plurality of first distance values, detect movement of the object after the light is output, obtain a plurality of second distance values between the plurality of output devices and the object through a second signal output using the at least one sensor, in response to the movement being detected, and output light through at least one second output device selected from among the plurality of output devices, based on at least one second distance value belonging to values in a second specified range among the plurality of second distance values.

According to an embodiment disclosed herein, a method of an electronic device may include obtaining a plurality of first distance values between a plurality of output devices included in the electronic device and an object, outputting light through at least one first output device selected from among the plurality of output devices, based on at least one first distance value belonging to values in a first specified range among the plurality of first distance values, obtaining a plurality of second distance values between the plurality of output devices and the object in response to a change in a position of the object after the light is output, and outputting light through at least one second output device selected from among the plurality of output devices, based on at least one second distance value belonging to values in a second specified range among the plurality of second distance values.

According an embodiment disclosed herein, an electronic device may include a sensor, a plurality of light emitting devices, and a processor, wherein the processor may detect a distance and an orientation to an external object using the sensor, specify a first light emitting device group corresponding to the orientation to the external object among the plurality of light emitting devices according to the distance to the external object and output information related to the external object using the first light emitting device group based on at least the distance to the external object or the orientation to the external object.

According to the embodiments disclosed herein, the electronic device may provide a user experience such as the user's interaction with the electronic device even when the user is away from the electronic device by providing a visual effect according to the location of an object.

According to the embodiments disclosed herein, the electronic device may identify positions of a plurality of objects through more accurate location measurement technique and provide different visual effects.

According to the embodiments disclosed herein, the electronic device may receive a more precise input (e.g., speech command) from the user by providing a visual effect corresponding to the user's location.

In addition, various effects may be provided that are directly or indirectly understood through the disclosure.

BRIEF DESCRIPTION OF THE DRAWINGS

FIG. 10 is an exemplary diagram for describing an operation of changing a color of light based on positions of a plurality of objects according to various embodiments.

In the description of the drawings, the same or similar reference numerals may be used for the same or similar components.

DETAILED DESCRIPTION OF EXAMPLE EMBODIMENTS

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1A:
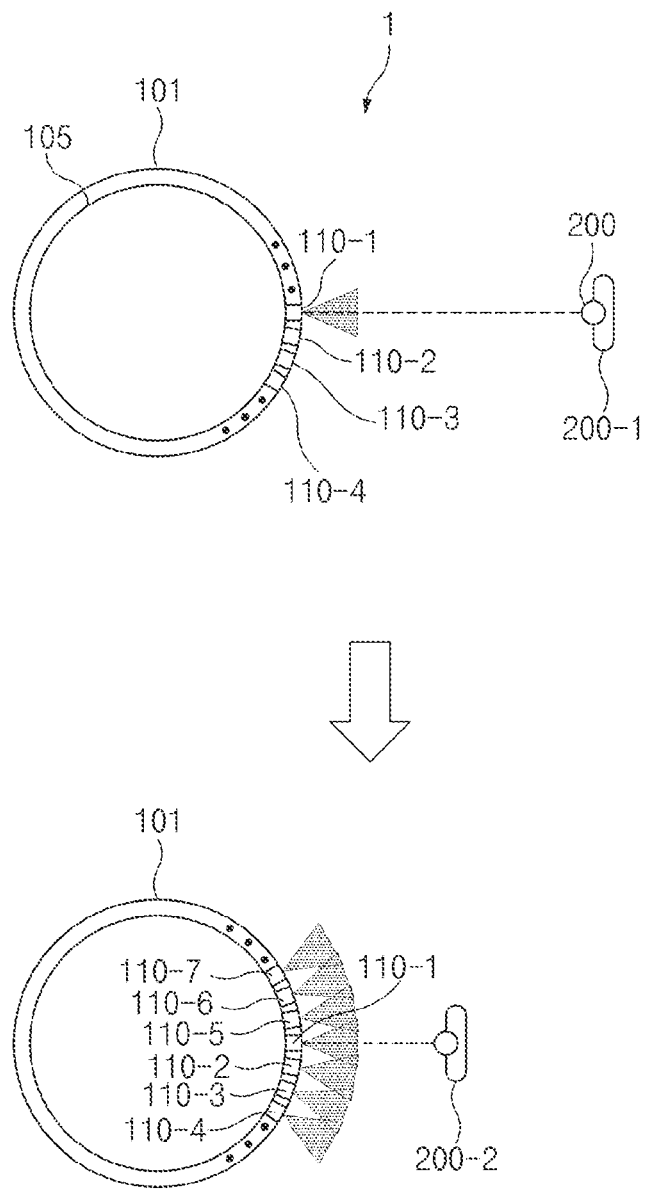
FIG. 1A is an exemplary diagram for describing an operation of outputting light based on a location of an object according to various embodiments.
Figure 1B:
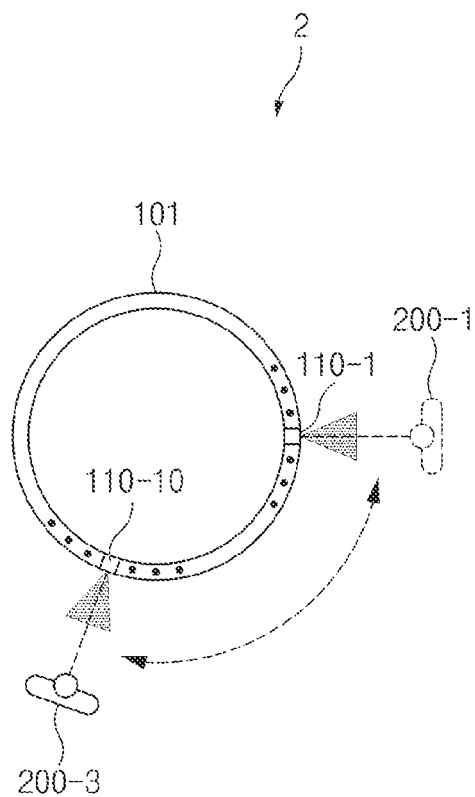
FIG. 1B is an exemplary diagram for describing another operation of outputting light based on a location of an object according to various embodiments.
Figure 1C:
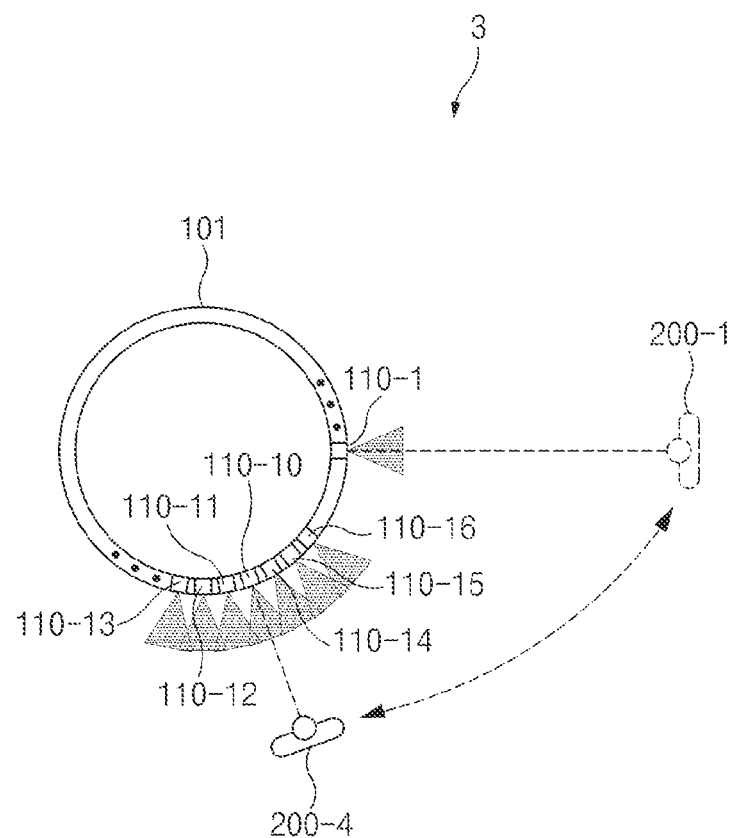
FIG. 1C is an exemplary diagram for describing another operation of outputting light based on a location of an object according to various embodiments.

FIGS. 1A to 1C are exemplary diagrams for describing an operation of outputting light based on a location of an object 200 according to various embodiments. FIGS. 1A to 1C may mean views of an electronic device 101 and the object 200 as viewed from the top.

Referring to FIG. 1A, the object 200 in a network environment 1 may mean a user of the electronic device 101. According to an embodiment, the object 200 may include one or more other targets of which movement may be detected by the electronic device 101, in addition to the user, the targets being specified.

According to an embodiment, the electronic device 101 may be an AI speaker. In addition to the AI speaker, the electronic device 101 may include at least one of a display device, a smart phone, a computing device, a portable medical device, a camera, a wearable device, or a home appliance. The electronic device 101 may include a housing 105 and a plurality of output devices 110-1, 110-2, 110-3, . . . , 110-M (M is a natural number). According to an embodiment, the electronic device 101 may further include a sensor module (not shown) that measures a location of the object 200. The sensor module may be disposed inside or outside the electronic device 101, for example. An embodiment of measuring a user's positon through the sensor module will be described in more detail with reference to FIG. 4.

According to an embodiment, at least a portion of the housing 105 may have a circular shape to provide a visual effect to the user in all directions. In addition to the circular shape, at least a portion of the housing 105 may have a straight-line shape, a triangular shape, a square shape, a rectangular shape, a polygonal shape, or an elliptical shape when viewed from the top of the electronic device 101.

According to an embodiment, the plurality of output devices 110-1, 110-2, 110-3, . . . , 110-M may be visually exposed through a portion of the housing 105, and disposed at different positions. For example, when the housing 105 has a circular shape, the plurality of output devices 110-1, 110-2, 110-3, . . . , 110-M may be arranged at regular angles to achieve an angle of 360 degrees. According to an embodiment, the plurality of output devices 110-1, 110-2, 110-3, . . . , 110-M may output light. For example, the plurality of output devices 110-1, 110-2, 110-3, . . . , 110-M may include a light emitting diode (LED) or a light emitting device such as a light bulb. According to another embodiment, at least some of the plurality of output devices may include a sound output device configured to provide a sound effect.

According to an embodiment, the electronic device 101 may measure a location of the object 200 through a sensor module (not shown), and output light through the plurality of output devices 110-1, 110-2, 110-3, . . . , 110-M based on the location of the object 200. The location of the object 200 may include, for example, a distance between the electronic device 101 and the object 200 or a direction of the object 200 with respect to the electronic device 101. For another example, the location of the object 200 may include a distance or direction between each of the plurality of output devices 110-1, 110-2, 110-3, . . . , 110-M and the object 200. The electronic device 101 may measure the location of the object 200 using at least one of, for example, a passive infra-red (PIR) sensor using heat generated from a human body, a motion detection sensor such as a thermopile, a distance sensor using infrared or ultrasonic waves, a camera sensor that measures the distance through an image or a radar sensor that analyzes a reflected signal after outputting a radio frequency (RF) signal. For another example, the electronic device 101 may measure the location of the object 200 based on ultra wide band (UWB) technology.

According to an embodiment, in the network environment 1, the electronic device 101 may obtain a first distance value between the electronic device 101 and the object 200 located at the first position 2001 through the sensor module and output light based on the first distance value. For example, the electronic device 101 may obtain the first distance values between the plurality of output devices 110-1, 110-2, 110-3, . . . , 110-M and the object 200 through the sensor module. In this case, the electronic device 101 may output light through at least one first output device (e.g., the output device 110-1) belonging to distance values in a first specified range among the first distance values.

According to an embodiment, after light is output from the at least one first output device, the object 200 may move to a second position 200-2 at which a distance value to the electronic device 101 is changed while not substantially changing the direction. The electronic device 101 may obtain second distance values between the object 200 located at the second position 200-2 and the electronic device 101 (or the plurality of output devices (110-1, 110-2, 110-3, . . . , 110-M)) through the sensor module. The second distance value may increase or decrease compared to the first distance value. When the second distance value is smaller than the first distance value, the electronic device 101 may increase the number of output devices that output light without changing an output device (e.g., 110-1) disposed at a center, among output devices that output light. For example, as shown in FIG. 1A, the electronic device 101 that outputs light through one output device (e.g., 110-1) may output light through a plurality of output devices (e.g., 110-1, 110-2, 110-3, 110-4, 110-5, 110-6, and 110-7) including the output device 110-1 based on the fact that the second distance value is smaller than the first distance value. For another example, when the object 200 moves such that the second distance value is larger than the first distance value, the electronic device 101 may decrease the number of output devices that output light.

According to an embodiment, in a network environment 2 of FIG. 1B, the object 200 may change a direction and move to a third position 200-3 after light is output from at least one first output device. The electronic device 101 may obtain a second distance value between the object 200 located at the third position 200-3 and the electronic device 101 (or the plurality of output devices (110-1, 110-2, 110-3, . . . , 110-M)) through the sensor module. Because the object 200 changes the direction and moves, an output device (that is, an output device having the smallest second distance value) facing the object 200 may be changed from the output device 110-1 to the output device 110-10. The electronic device 101 may change the output device that outputs light to the output device 110-10 having the smallest second distance value without changing the number of output devices that output light.

According to an embodiment, in a network environment 3 of FIG. 1C, the object 200 may move to a fourth position 200-4 at which a direction and a distance are changed, after light is output from at least one first output device. The electronic device 101 may obtain a second distance value between the object 200 located at the fourth position 200-4 and the electronic device 101 (or the plurality of output devices (110-1, 110-2, 110-3, . . . , 110-M)) through the sensor module. Because the object 200 changes the direction and the distance and moves, an output device (that is, an output device having the smallest second distance value) facing the object 200 may be changed from the output device 110-1 to the output device 110-10 and the second distance value may increase or decrease compared to the first distance value. The electronic device 101 may change the output device having the smallest second distance value and the number of output devices that output light. For example, in response to a change in the location of the object 200 to the fourth position 200-4, the electronic device 101 may output light through a plurality of output devices (e.g., 110-10, 110-11, 110-12, 110-13, 110-14, 110-15, and 110-16) including the output device 110-10.

Through the above-described method, the electronic device 101 may provide different visual effects in response to the user's movement, thus providing a user experience such as the user's interaction with the electronic device 101. In addition, the electronic device 101 may receive a user input more precisely when the electronic device 101 receives the user input with a directionality such as beamforming because the user provides a user input (e.g., a speech command) after viewing a visual effect provided from the electronic device 101.

Figure 2A:
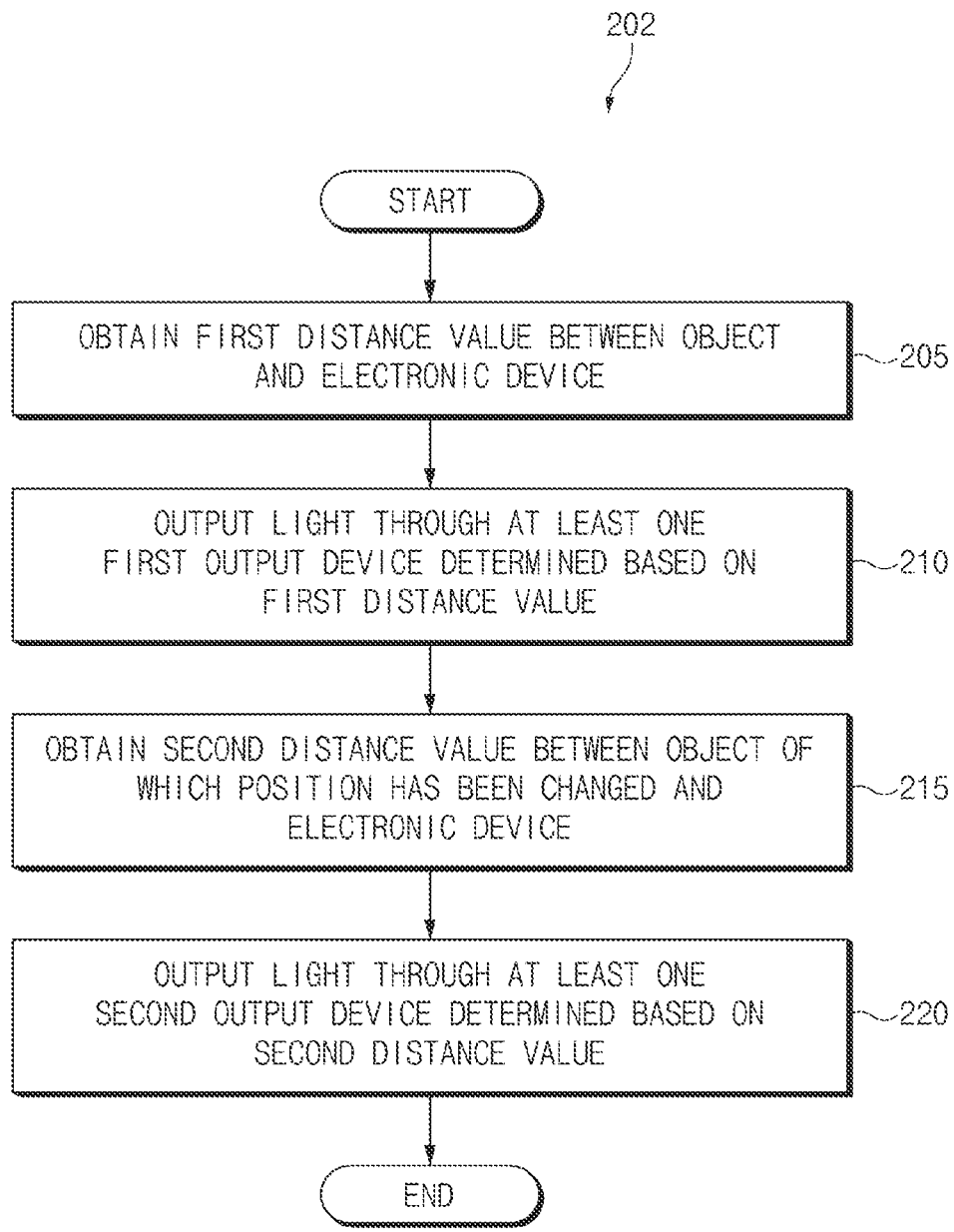
FIG. 2A is a flowchart of an operation of an electronic device that outputs light based on a location of an object, according to various embodiments.

FIG. 2A is a flowchart of an operation of the electronic device 101 that outputs light based on a position of the object 200, according to various embodiments. Operations shown in FIG. 2A may be performed by the electronic device 101 or a component of the electronic device 101 (e.g., a processor 120 of FIG. 3).

Referring to FIG. 2A, in operation 205 of method 202, the electronic device 101 may obtain a first distance value between the object 200 and the electronic device 101. The first distance value may mean, for example, distance values between the plurality of output devices 110-1, 110-2, 110-3, . . . , 110-M and the object 200. According to an embodiment, the electronic device 101 may obtain a distance value using a sensor module disposed outside or inside the electronic device 101. For example, when the electronic device 101 obtains a distance value by using a radio signal, the electronic device 101 may determine a position of the object 220 based on at least one of a time for which a signal output from the sensor module is reflected and returned, and a direction in which the signal is output.

In operation 210, the electronic device 101 may output light through at least one first output device determined based on the first distance value. For example, the electronic device 101 may determine first distance values between the plurality of output devices 110-1, 110-2, . . . , 110-M and the object 200. The electronic device 101 may determine at least one first distance value belonging to distance values in a first specified range among the first distance values, and output light through at least one first output device corresponding to the determined at least one first distance value.

In operation 215, the electronic device 101 may obtain a second distance value between the object 200 of which a position has been changed after light is output and the electronic device 101. The second distance value may mean, for example, distance values between the object 200 and the plurality of output devices 110-1, 110-2, . . . , 110-M. According to an embodiment, the electronic device 101 may obtain a second distance value in the same or at least partially similar manner as in operation 205.

In operation 220, the electronic device 101 may output light through at least one second output device determined based on the second distance value. For example, the electronic device 101 may determine second distance values between the plurality of output devices 110-1, 110-2, . . . , 110-M and the object 200 of which a position has been changed. The electronic device 101 may determine at least one second distance value belonging to distance values in a second specified range among the second distance values, and output light through at least one second output device corresponding to the determined at least one second distance value.

According to an embodiment, the distance values in the second specified range may be the same as or at least partially different from the distance values in the first specified range. When the second distance value is smaller than the first distance value (that is, when the object 200 moves toward the electronic device 101), the electronic device 101 may increase the number of output devices that output light. According to an embodiment, the electronic device 101 may change a color or brightness of light based on the second distance value and the first distance value. For example, the electronic device 101 may perform control such that a color of light is changed to red as the second distance value decreases, and the color of light is changed to blue as the second distance value increases.

Figure 2B:
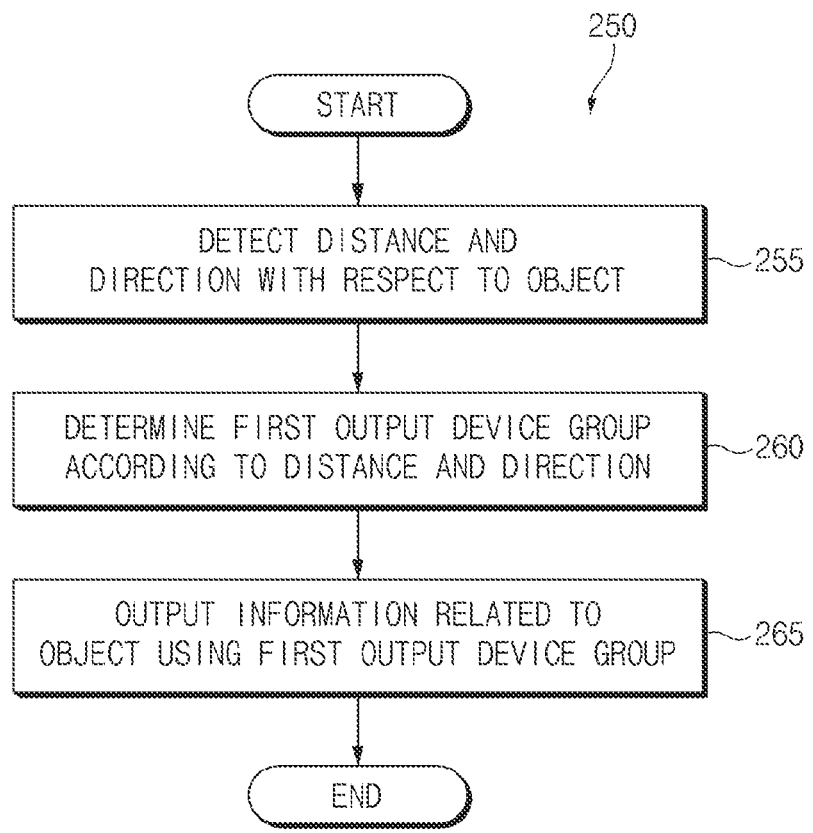
FIG. 2B is a flowchart of an operation of an electronic device that outputs information related to an object based on a position or direction of an object, according to various embodiments.

FIG. 2B is a flowchart of an operation of the electronic device 101 that outputs information related to the object 200 based on a position or direction of the object, according to various embodiments.

Referring to FIG. 2B, in operation 255 of method 250, the electronic device 101 may detect a distance and a direction with respect to the object 200. According to an embodiment, the electronic device 101 may measure a position of the object 200 using at least one of a PIR sensor, a motion detection sensor, a distance sensor, a camera sensor, or a radar sensor. For example, when the sensor supports UWB technology, the sensor may be disposed in a position adjacent to the plurality of output devices 110-1, 110-2, . . . , 110-M.

According to an embodiment, the electronic device 101 may include a display. According to an embodiment, some of the plurality of output devices may output light according to an embodiment through driving of pixels disposed on the display (driving of OLEDs or micro LEDs).

In operation 260, the electronic device 101 may determine a first output device according to a distance and a direction. For example, the electronic device 101 may determine a first output device group (or a first light emitting device group) corresponding to a direction with respect to the object 200 among the plurality of output devices 110-1, 110-2, . . . , 110-M, according to the distance to the object 200.

In operation 265, the electronic device 101 may output information related to the object 200 by using the first output device group. The information related to the object 200 may include light, sound, or vibration, for example. According to an embodiment, the electronic device 101 may control at least one of the number of output devices included in the first output device group, or a color or output strength of information related to the object 200, according to the distance with respect to the object 200.

Figure 3:
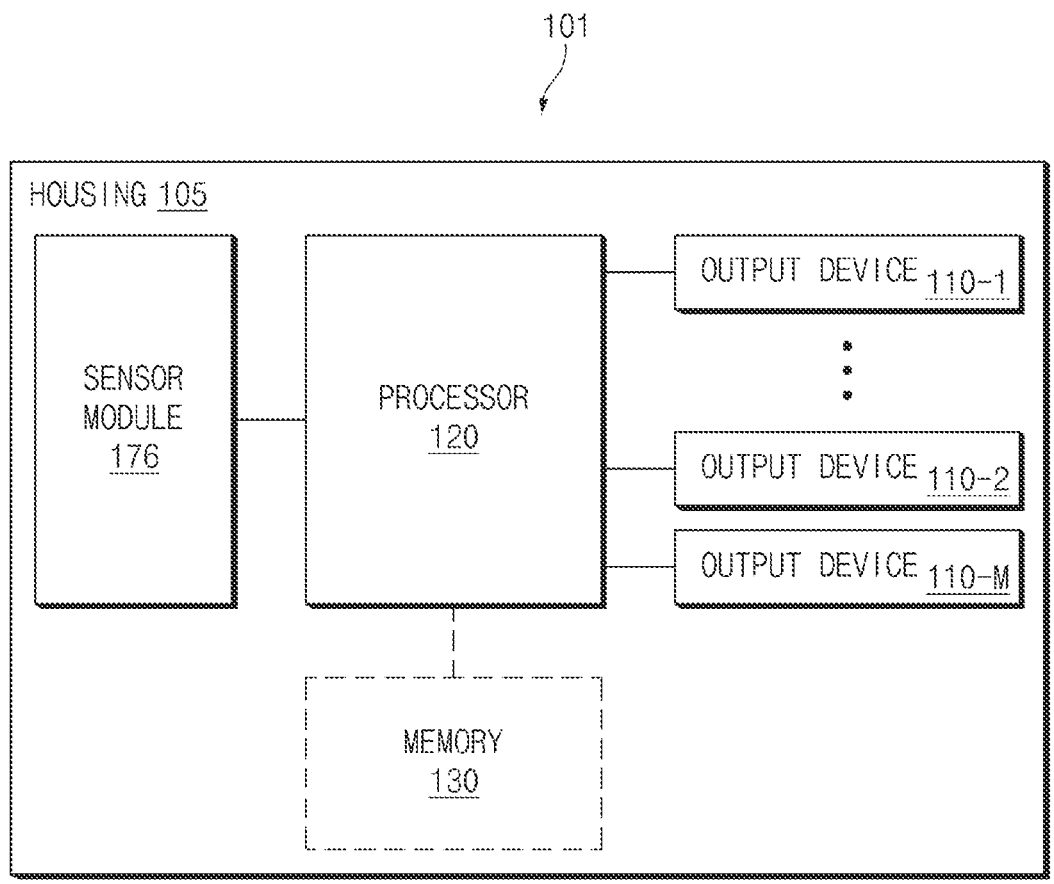
FIG. 3 is a block diagram of an electronic device that outputs light based on a location of an object, according to various embodiments.

FIG. 3 is a block diagram of the electronic device 101 that outputs light based on a position of the object 200, according to various embodiments.

Referring to FIG. 3, the electronic device 101 may include the housing 105, a sensor module 176, the processor 120, the plurality of output devices 110-1, 110-2, . . . , 110-M, and/or a memory 130. According to an embodiment, the electronic device 101 may omit at least one of the components illustrated in FIG. 2, or may further include at least one other component. For example, the electronic device 101 may omit the memory 130. For another example, the electronic device 101 may further include at least one of components of FIG. 13.

According to an embodiment, the plurality of output devices 110-1, 110-2, 110-3, . . . , 110-M may be arranged to be visually exposed through a portion of the housing 105. For another example, the plurality of output devices 110-1, 110-2, 110-3, . . . , 110-M may be disposed inside the housing 105. In this case, the housing 105 may include a material which light output from the plurality of output devices 110-1, 110-2, 110-3, . . . , 110-M transmits.

According to an embodiment, the sensor module 176 may include at least one sensor. The sensor module 176 may be mounted inside the electronic device 101 or may be disposed outside the electronic device 101. When the sensor module 176 is disposed inside the electronic device 101, the sensor module 176 may be disposed at a position adjacent to the plurality of output devices 110-1, 110-2, 110-3, . . . , 110-M. The electronic device 101 may obtain distance values between the object 200 and the plurality of output devices 110-1, 110-2, 110-3, . . . , 110-M disposed at positions adjacent to the sensor module 176 based on a distance value between the sensor module 176 and the object 200. The sensor module 176 may obtain the distance value between the object 200 and the sensor module 176 using, for example, ultra wide band (UWB) technology.

According to an embodiment, the processor 120 may be operatively connected to the plurality of output devices 110-1, 110-2, 110-3, . . . , 110-M, the sensor module 176, and/or the memory 130. The processor 120 may perform an overall function of the electronic device 101 to provide a visual effect based on the position of the object 200.

For example, the processor 120 may obtain first distance values between the object 200 and the plurality of output devices 110-1, 110-2, 110-3, . . . , 110-M through the sensor module 176. The processor 120 may output light through at least one output device (e.g., the first output device 110-1) belonging to distance values in a first specified range among the first distance values.

For another example, the processor 120 may obtain second distance values between the plurality of output devices 110-1, 110-2, 110-3, . . . , 110-M and the object 200 of which a position has been changed through the sensor module 176 in response to a change in the position of the object 200 after light has been output. The processor 120 may output light through at least one second output device selected from among the plurality of output devices, based on at least one second distance value belonging to distance values in a second specified range among the second distance values. When the second distance value is larger than the first distance value, the processor 120 may increase the number of output devices that output light, and vice versa.

For another example, the processor 120 may control a color or brightness of light output from the plurality of output devices 110-1, 110-2, 110-3, . . . , 110-M in response to the change in the position of the object 200.

According to an embodiment, the memory 130 may store instructions required for the processor 120 to perform an operation of the electronic device 101. For example, the memory 130 may store information on the number of output devices, a color of light, or a brightness of light which is changed according to the position of the object 200.

Figure 4:
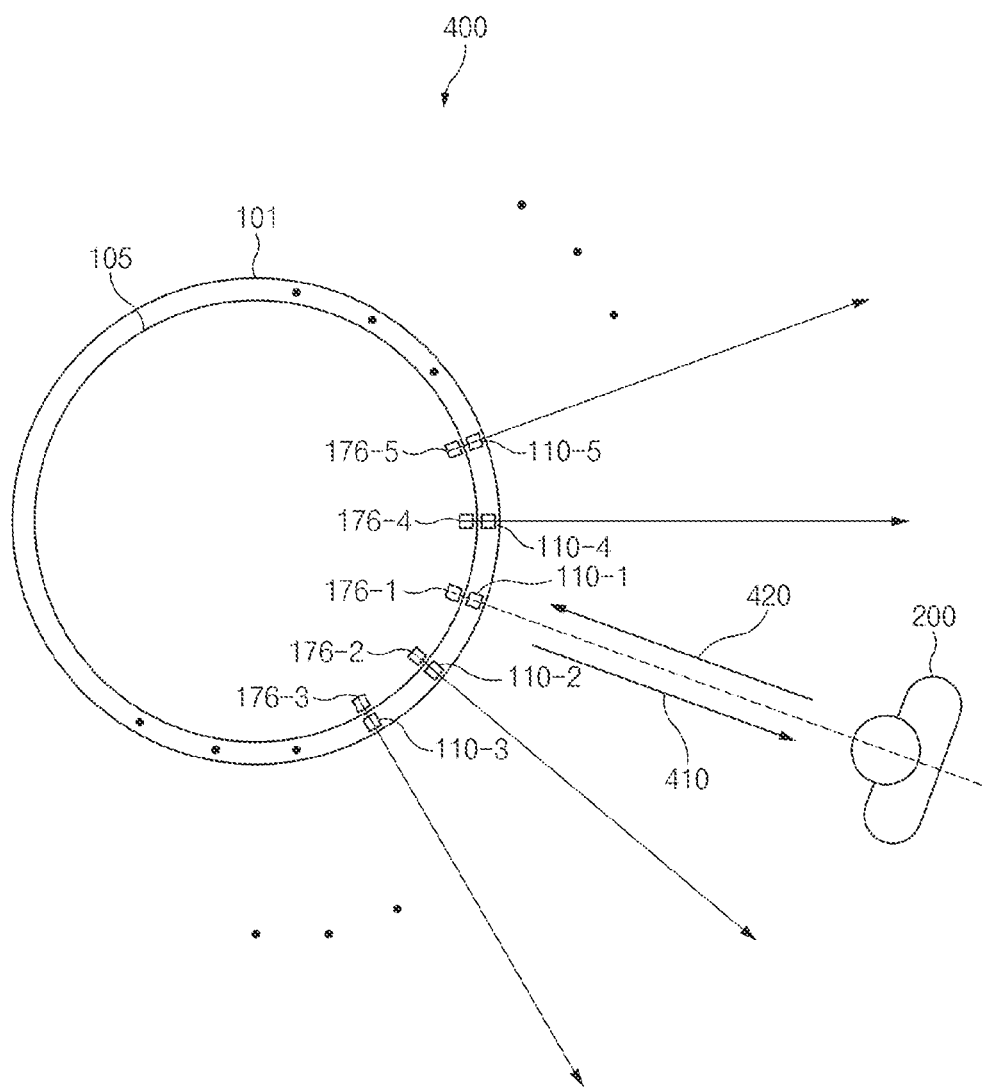
FIG. 4 is an exemplary diagram for describing an operation of measuring a location of an object using ultra wide band (UWB) technology according to various embodiments.

FIG. 4 is an exemplary diagram for describing an operation of measuring a position of the object 200 using UWB technology according to various embodiments.

Referring to FIG. 4, in a network environment 400, the electronic device 101 may measure a position of the object 200 using UWB technology. UWB technology may use a signal having a wide frequency bandwidth of 500 megahertz (MHz) or more in a baseband. Because a signal based on UWB technology has a wide frequency bandwidth and a short pulse, the accuracy of position measurement may be high, so that the electronic device 101 may more accurately identify a plurality of objects.

According to an embodiment, the electronic device 101 may include the plurality of output devices 110-1, 110-2, . . . , 110-M arranged to be visually exposed through a portion of the housing 105. The electronic device 101 may include a plurality of sensors 176-1, 176-2, . . . , 176-N (N is a natural number) disposed at positions adjacent to the plurality of output devices 110-1, 110-2, . . . , 110-M. The plurality of sensors 176-1, 176-2, . . . , 176-N may constitute the sensor module 176 of FIG. 2. According to an embodiment, the plurality of sensors 176-1, 176-2, . . . , 176-N may include an antenna configured to transmit and receive signals. The plurality of sensors 176-1, 176-2, . . . , 176-N may be disposed inside the housing 105 or may be visually exposed through a portion of the housing 105. According to an embodiment, the number of a plurality of sensors may be identical to or different from the number of a plurality of output devices. For example, when the housing 105 has a circular shape, the plurality of sensors 176-1, 176-2, ..., 176-N may be arranged to have a field of view (FOV) of 10 degrees or more to detect an object in all directions of 360 degrees.

According to an embodiment, the electronic device 101 may transmit a signal through the plurality of sensors 176-1, 176-2, ..., 176-N, and measure the position of the object 200 through a signal reflected from the object 200. For example, the electronic device 101 may obtain a distance value between the object 200 and the sensor 176-1 through at least one of a time taken for a signal 310 transmitted from the sensor 176-1 to return, a frequency shift between a transmitted signal 410 and a reflected signal 420, or a strength of the reflected signal 420. Because the sensor 176-1 is disposed adjacent to the output device 110-1, the electronic device 101 may obtain a distance value between the output device 110-1 and the object 200 based on the obtained distance value. As another example, the electronic device 101 may measure a direction (or angle) in which the object 200 is located in a relationship with the electronic device 101 by determining an output device having the shortest distance with respect to the object 200. For example, the electronic device 101 may determine that the object 200 is located in a direction (or angle) in which the sensor 176-1 is disposed because the distance value between the sensor 176-1 and the object 200 is the smallest among the distance values between the plurality of sensors 176-1, 176-2, ..., 176-N and the object 200.

Figure 5:
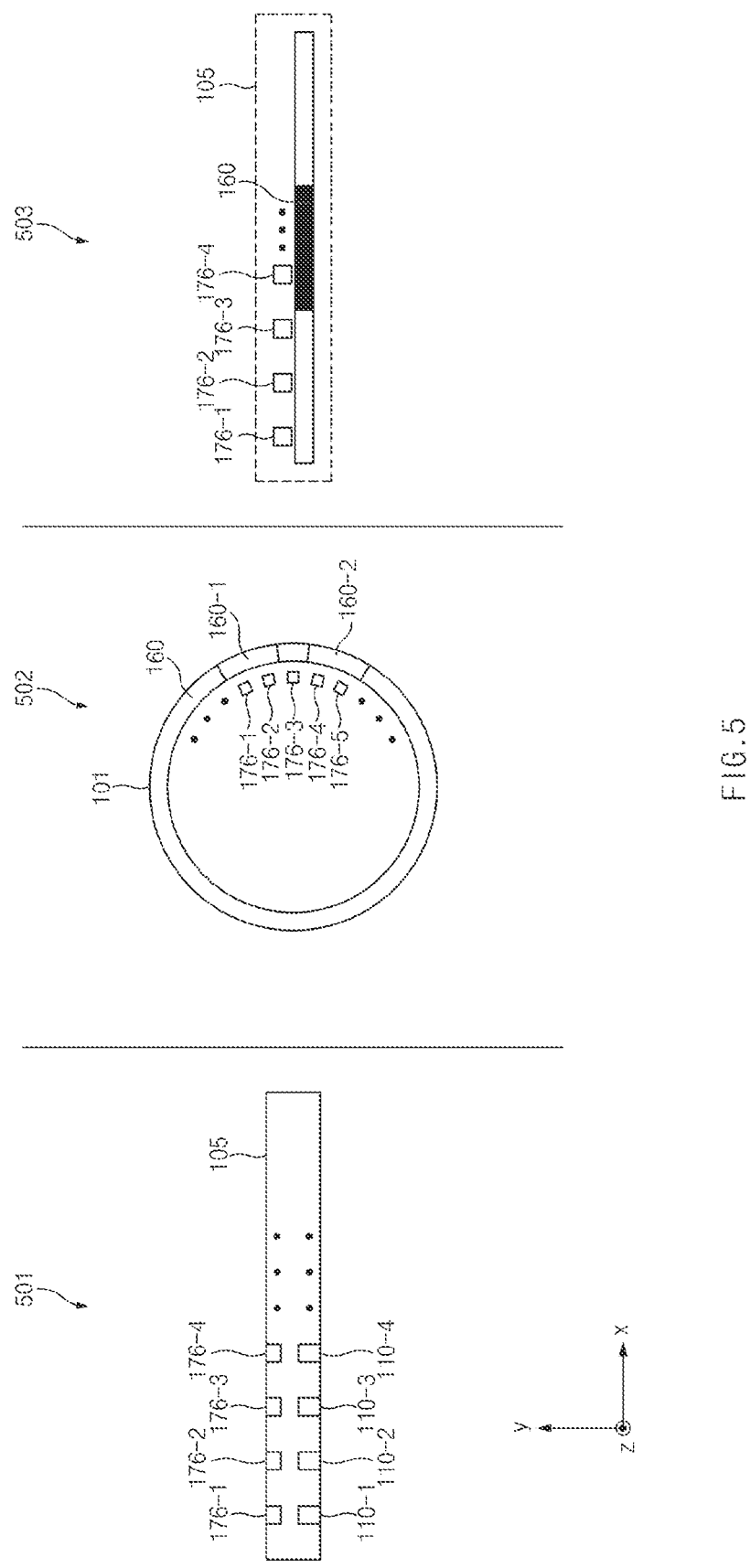
FIG. 5 illustrates a sensor module and a plurality of output devices according to various embodiments.

FIG. 5 illustrates a sensor module and a plurality of output devices according to various embodiments. The components shown in FIG. 5 may refer to a view as viewed from the top of the electronic device 101.

Referring to reference numeral 501 of FIG. 5, the electronic device 101 may include the housing 105 of a rectangular shape. The plurality of output devices 110-1, 110-2, ..., 110-M may be visually exposed through a portion of the housing 105 and may be disposed at regular intervals. The plurality of sensors 176-1, 176-2, ..., 176-N may be disposed at positions adjacent to the plurality of output devices 110-1, 110-2, ..., 110-M. The number of the plurality of sensors may be identical to or different from the number of the plurality of output devices. According to an embodiment, the plurality of output devices 110-1, 110-2, ..., 110-M disposed in the housing 105 of the rectangular shape may output light in the same direction (e.g., −y axis).

Referring to reference numeral 502 according to an embodiment, the electronic device 101 may include a flexible display 160 that is visually exposed through a portion of a housing (not shown) and has a circular shape. The display 160 may output light through output devices in pixel units which are disposed in the display 160. The plurality of sensors 176-1, 176-2, ..., 176-N may be disposed inside the display 160. The electronic device 101 may output light onto a partial area (e.g., 160-1 or 160-2) of the display 160 based on the position of the object 200 measured through the plurality of sensors 176-1, 176-2, ..., 176-N.

Referring to reference numeral 503 according to an embodiment, the electronic device 101 may include the display 160 that is visually exposed through a portion of the housing 105 and has a straight-line shape. The plurality of sensors 176-1, 176-2, ..., 176-N may be disposed inside the display 160. The electronic device 101 may output light onto a partial area (e.g., 160-3) of the display 160 based on the position of the object 200 measured through the plurality of sensors 176-1, 176-2, ..., 176-N.

Figure 6:
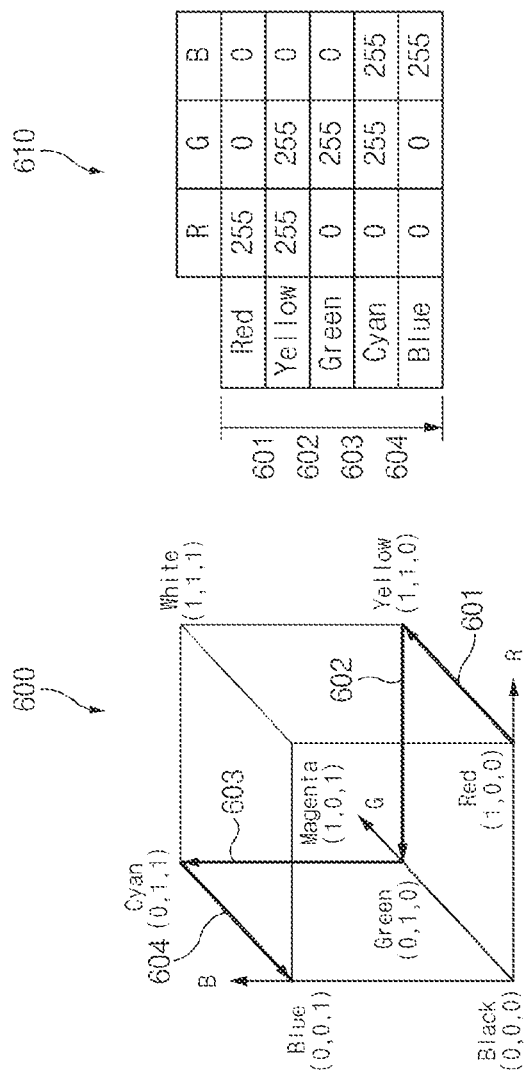
FIG. 6 is an exemplary diagram for describing an operation of adjusting a color of light based on a location of an object according to various embodiments.

FIG. 6 is an exemplary diagram for describing an operation of adjusting a color of light based on a position of the object 200 according to various embodiments.

Referring to FIG. 6, coordinates 600 may refer to an RGB cube representing RGB (red green blue) values in three-dimensional (3D) coordinates. Table 610 shows an example in which an 8-bit RBG value is changed based on a distance value. Because coordinate values in the coordinates 600 may be changed in the order of direction 601, direction 602, direction 603, and direction 604 as a distance value between the object 200 and the output device increases, a color of light may be changed in the order of red, yellow, green, cyan, and blue. In coordinates 600, a coordinate value of 1 may correspond to a distance value of 1 (unit, meter (m)), and the coordinate value of 1 may correspond to a RGB value of 255 in table 610. For example, when the distance value is 0 (or substantially 0), the coordinate value in coordinates 600 is (1,0,0) and an R value is 255, a G value is 0, and a B value is 0 in table 610, so a color of the light may be red. While the distance value increases by 1 m, the G value in coordinates 600 may increase in proportion to the distance value. When the distance value is 1, the coordinate value is (1,1,0), and the R value is 255, the G value is 255, and the B value is 0 in table 610, so that the color of light may be yellow. According to the same principle, while the distance value increases from 1 to 2, the R value decreases in coordinate 600, so that the color of light may be green when the distance value is 3. While the distance value increases from 2 to 3, the B value increases in coordinates 600, so that the color of light may be cyan when the distance value is 3. While the distance value increases from 3 to 4, the G value decreases in coordinates 600, so that the color of light may be blue when the distance value is 4.

Figure 7:
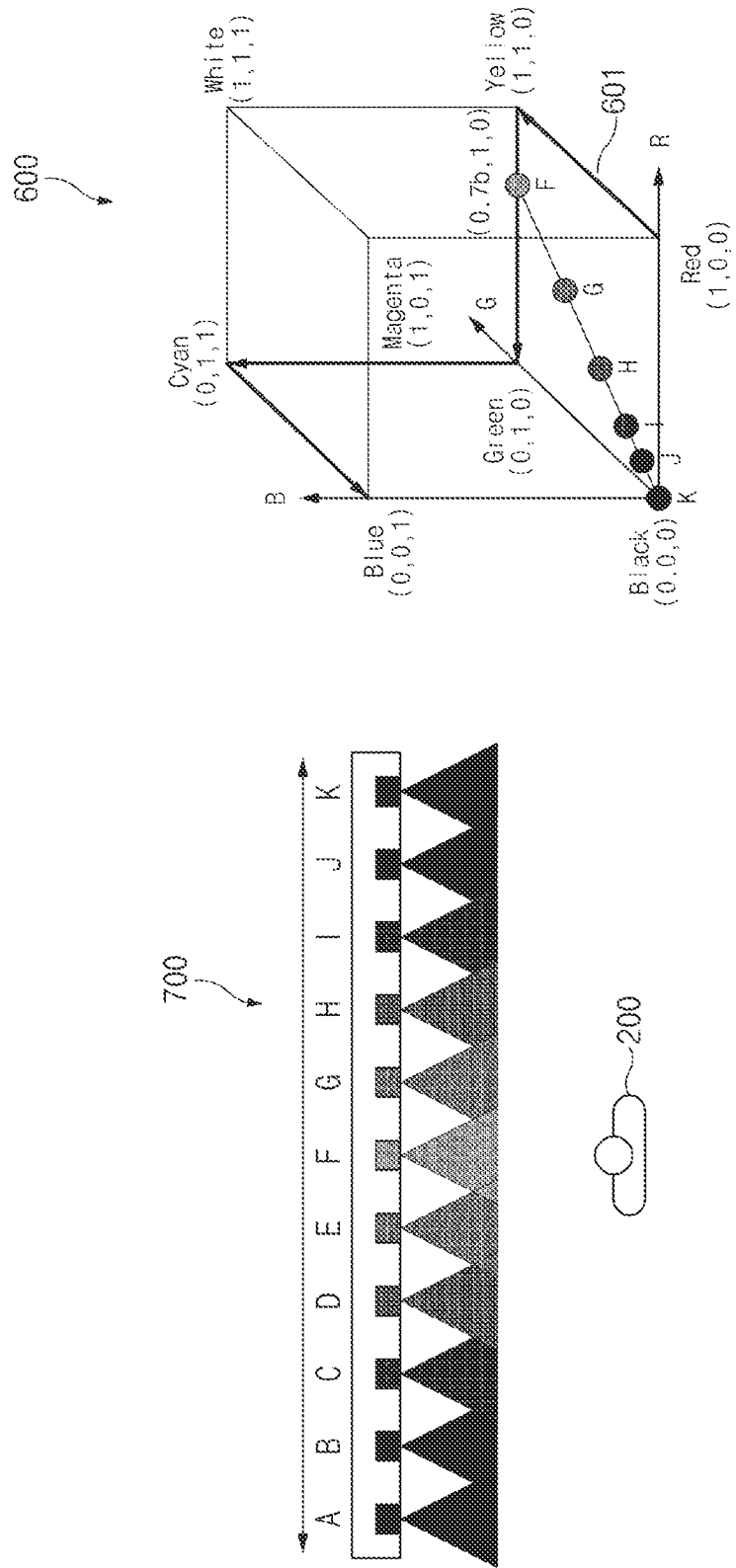
FIG. 7 is an exemplary diagram for describing an operation of adjusting the number of a plurality of output devices and the brightnesses and colors of light and color of the plurality of output devices based on a location of an object according to various embodiments.

FIG. 7 is an exemplary diagram for describing an operation of adjusting the number of a plurality of output devices and the brightnesses and colors of light and color of the plurality of output devices based on a position of the object 200 according to various embodiments.

Referring to FIG. 7, in a network environment 700, the electronic device 101 may determine an output device F having the smallest distance value and the number of output devices that output light. According to an embodiment, the number of output devices may be determined based on a distance value between the output device F and the object 200. The electronic device 101 may perform control such that the number of output devices increases as the distance value between the object 200 and the output device F decreases, and the number of output devices decreases as the distance value increases. For example, the number of output devices based on the distance value may be determined as shown in Table 1 below.

TABLE 1

| Distance value (unit: m) | 0 (or 0.1) | 1 | 2 | 3 | 4 | 5 | 6 |
|---|---|---|---|---|---|---|---|
| Number of output devices (unit: number) | 13 | 11 | 9 | 7 | 5 | 3 | 1 |

The distance values or the number of output devices shown in Table 1 are only examples, and various embodiments disclosed herein are not limited to the numbers shown in Table 1.

The distance values or the number of output devices shown in Table 1 are only examples, and various embodiments disclosed herein are not limited to the numbers shown in Table 1.

According to an embodiment, the electronic device 101 may determine a color of light of the output device F, and determine colors or brightnesses of the light of other output devices A, B, C, D, E, G, H, I, J, and K disposed at positions adjacent to the output device F. For example, when the distance value between the output device F and the object 200 is 1.24 m, the coordinate value F in coordinates 600 is (0.76, 1, 0) and the color of the light of the output device F may be yellow. The electronic device 101 may perform control such that the color of light has black as the output devices are disposed farther from the output device F. For example, the electronic device 101 may perform control such that a coordinate value converges to (0,0,0) in coordinates 600 in the order of the output devices G, H, I, J, and K (or E, D, C, B, and A).

Figure 8:
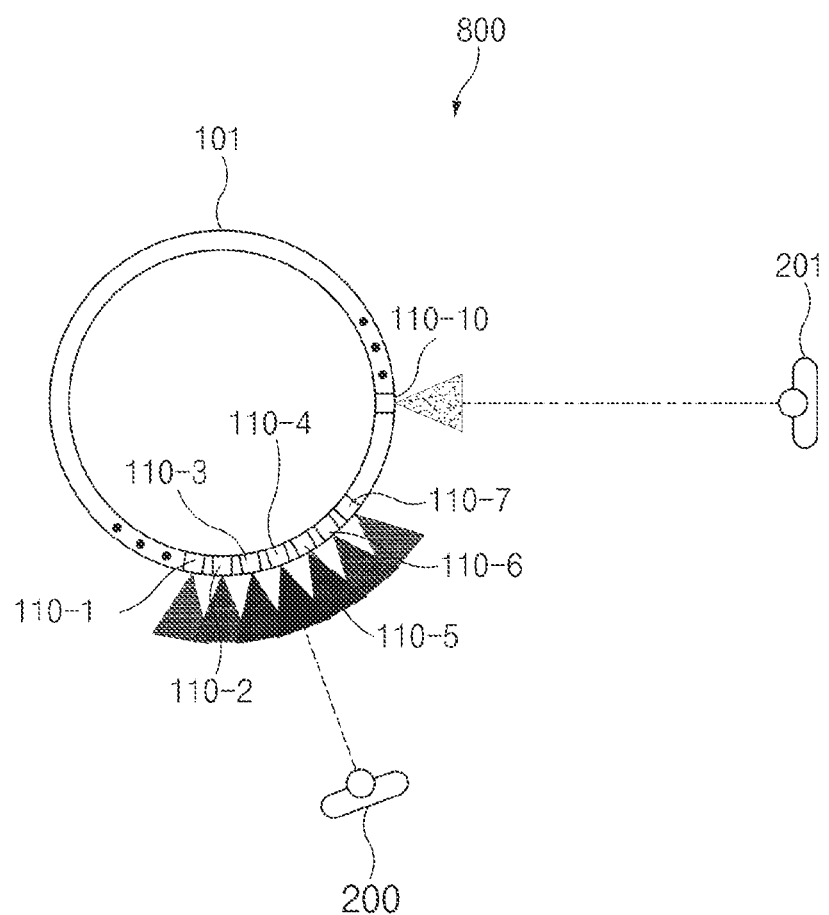
FIG. 8 is an exemplary diagram for describing an operation of outputting light based on positions of a plurality of objects according to various embodiments.

FIG. 8 describes an operation of outputting light based on positions of a plurality of objects 200 and 201 according to various embodiments. Although the embodiment in which the electronic device 101 measures the positions of two objects 200 and 201 is illustrated, the number of objects is not limited to the example shown in FIG. 8.

Referring to FIG. 8, in a network environment 800, the electronic device 101 may measure a position of the second object 201 while at least one output device (e.g., 110-1, 110-2, 110-3, 110-4, 110-5, 110-6, 110-7) outputs light. For example, the electronic device 101 may transmit a signal through the sensor module 176 to obtain a third distance value between the second object 201 and the electronic device 101 (or the plurality of output devices 110-1, 110-2, ..., 110-M). The electronic device 101 may determine at least one third distance value belonging to distance values in a third specified range among the third distance values. The electronic device 101 may output light through at least one third output device corresponding to at least one third distance value among the plurality of output devices 110-1, 110-2, ..., 110-M.

According to an embodiment, a specified third distance value may be identical to or different from a specified first distance value or a specified second distance value. For example, when the specified third distance value is identical to the specified first distance value, the electronic device 101 may output light through an output device 110-10 having the smallest third distance value (or facing the second object 201). Although FIG. 8 shows an embodiment of outputting light through the output device 110-10, the electronic device 101 may output light through a plurality of output devices including the output device 110-10 according to a third distance value. According to an embodiment, a color of light output toward the first object 200 (e.g., the object 200 of FIG. 1) may be different from a color of light output toward the second object 201.

Through the above-described method, the electronic device 101 may provide different visual effects in response to movement of a plurality of users, thus providing a user experience such as the plurality of users' interaction with the electronic device 101.

Figure 9:
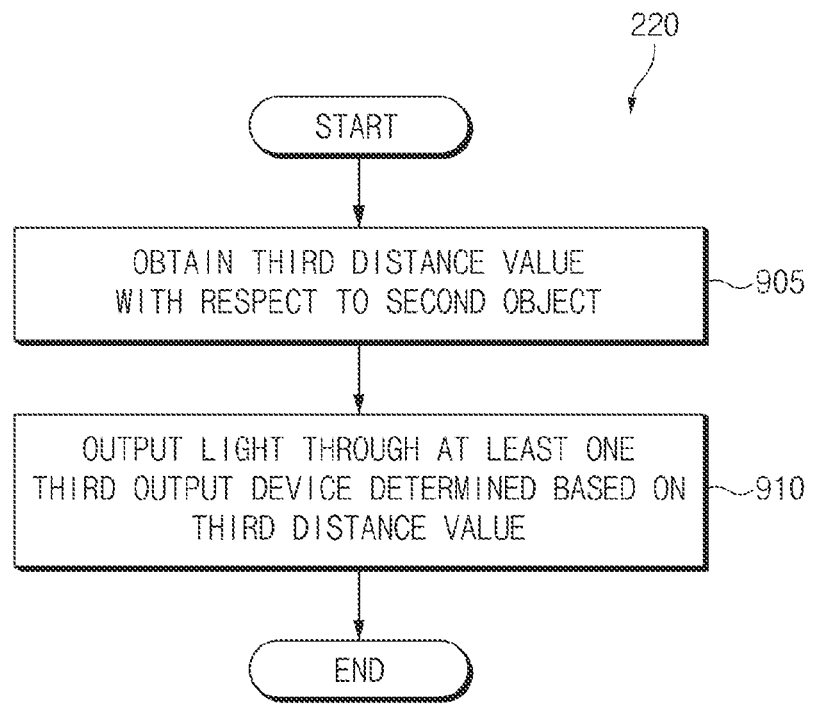
FIG. 9 is a flowchart of an operation of an electronic device that outputs light based on positions of a plurality of objects, according to various embodiments.

FIG. 9 is a flowchart of an operation of the electronic device 101 that outputs light based on positions of the plurality of objects 200 and 201, according to various embodiments. Operations illustrated in FIG. 9 may mean operations performed after operation 220 of FIG. 2A.

Referring to FIG. 9, in operation 905, the electronic device 101 may obtain a third distance value with respect to the second object 201 while light is output through at least one second output device. According to an embodiment, the electronic device 101 may obtain a third distance value between the electronic device 101 (or the plurality of output devices (110-1, 110-2, ..., 110-M) and the second object 201. According to an embodiment, the electronic device 101 may measure a position of the object 200 using at least one of a PIR sensor, a motion detection sensor, a distance sensor, a camera sensor, or a radar sensor.

In operation 910, the electronic device 101 may output light through at least one third output device determined based on the third distance value. For example, the electronic device 101 may determine at least one third distance value belonging to distance values in a third specified range among the third distance values, and output light through at least one third output device corresponding to at least one third distance value among the plurality of output devices 110-1, 110-2, ..., 110-M. The electronic device 101 may output light through at least one third output device while light is output through at least one second output device. A color of light output through at least one third output device may be different from a color of light output from at least one output device including at least one second output device.

According to an embodiment, the electronic device 101 may selectively perform an operation of outputting light for a plurality of objects. For example, in a first mode, the electronic device 101 may output light for a plurality of objects as illustrated in the embodiment of FIG. 8. For another example, in a second mode, the electronic device 101 may not output light toward the second object 201 even when the electronic device 101 detects the second object 201 to reduce power consumption. According to an embodiment, the first mode and the second mode may be determined according to a user input or may be determined by the electronic device 101 (e.g., the processor 120) based on a remaining battery capacity of the electronic device 101.

FIG. 10 is an exemplary diagram for describing an operation of changing a color of light based on positions of a plurality of objects according to various embodiments.

Referring to FIG. 10, in a network environment 1000, the electronic device 101 may determine a color of light of an output device 8 having the smallest distance value with respect to the object 200 and a color of light of an output device 3 having the smallest distance value with respect to the second object 201. For example, the electronic device 101 may determine the color of light of the output device 3 to be cyan and the color of light of the output device 8 to be green.

According to an embodiment, the electronic device 101 may determine colors or brightnesses of light of other output devices disposed at positions adjacent to the output device 8 and the output device 3 based on the determined color of light. The electronic device 101 may perform control such that the color of light has black as the output devices are disposed farther from the output device 8 and the output device 3. For example, the electronic device 101 may perform control such that a coordinate value converges to (0,0,0) in coordinates 600 in the order of the output devices 2 and 1 (or 9, 10 and 11) according to path 1020. The electronic device 101 may perform control such that a color of light has white as output devices overlap other output devices among the plurality of output devices 5, 6, 7, 8, 9, 10, and 11 that output light toward the object 200 and the plurality of output devices 1, 2, 3, 4, and 5 that output light toward the second object 201. For example, the electronic device 101 may perform control such that a coordinate value converges to (1,1,1) in coordinates 600 in the order of the output devices 4 and 5 (or 7, 6 and 5) according to path 1010. Through the above-described method, when output devices that output light overlap each other, the electronic device 101 may prevent user confusion by adjusting a color of the light.

Figure 11:
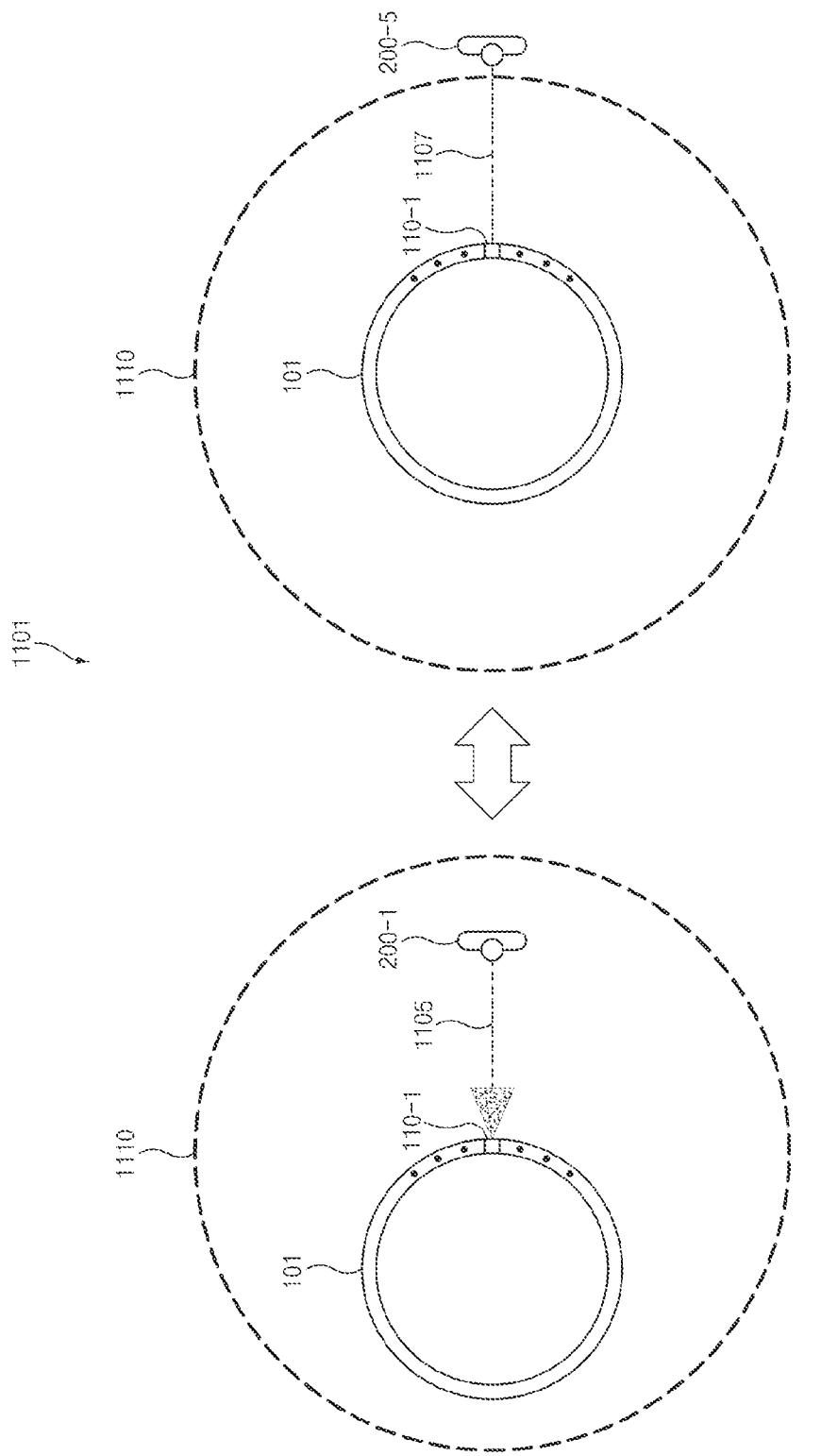
FIG. 11 is an exemplary diagram for describing an operation of outputting light based on a distance value and a threshold distance according to various embodiments.

FIG. 11 is an exemplary diagram for describing an operation of outputting light based on a distance value and a threshold distance 1110 according to various embodiments.

Referring to FIG. 11, in a network environment 1101, the electronic device 101 may have the threshold distance 1110. When a distance value between the output device 110-1 having the smallest distance value and the object 200 is larger than the threshold distance 1110, the electronic device 101 may perform control such that the plurality of output devices 110-1, 110-2, 110-3, ..., 110-M do not output light. For example, the electronic device 101 may output light through the output device 110-1 because a distance value 1105 between the output device 110-1 disposed at the closest position to the object 200 and the object 200 is smaller than the threshold distance 1110 when the object 200 is located at a first position 200-1. For another example, the electronic device 101 may perform control such that the output device 110-1 does not output light because a distance value 1107 between the output device 110-1 disposed at the closest position to the object 200 and the object 200 is larger than the threshold distance 1110 when the object 200 is located at a second position 200-5. When the object 200 is out of the threshold distance 1110, the electronic device 101 may perform control such that the plurality of output devices 110-1, 110-2, 110-3, ..., 110-M do not output light, thus reducing power consumption.

According to an embodiment, the electronic device 101 may provide a visual effect through at least one output device including the output device 110-1 when the object 200 located outside the threshold distance (e.g., when the object 200 is located at the second position 200-5) moves to a boundary of the threshold distance. For example, the electronic device 101 may provide an effect in which light flickers for a certain period of time (blinking effect), an effect in which an output device that outputs light is diffused to both sides around the output device 110-1 (peripheral diffusion effect) or, an effect in which an output device that outputs light moves in one direction (sliding effect).

Figure 12:
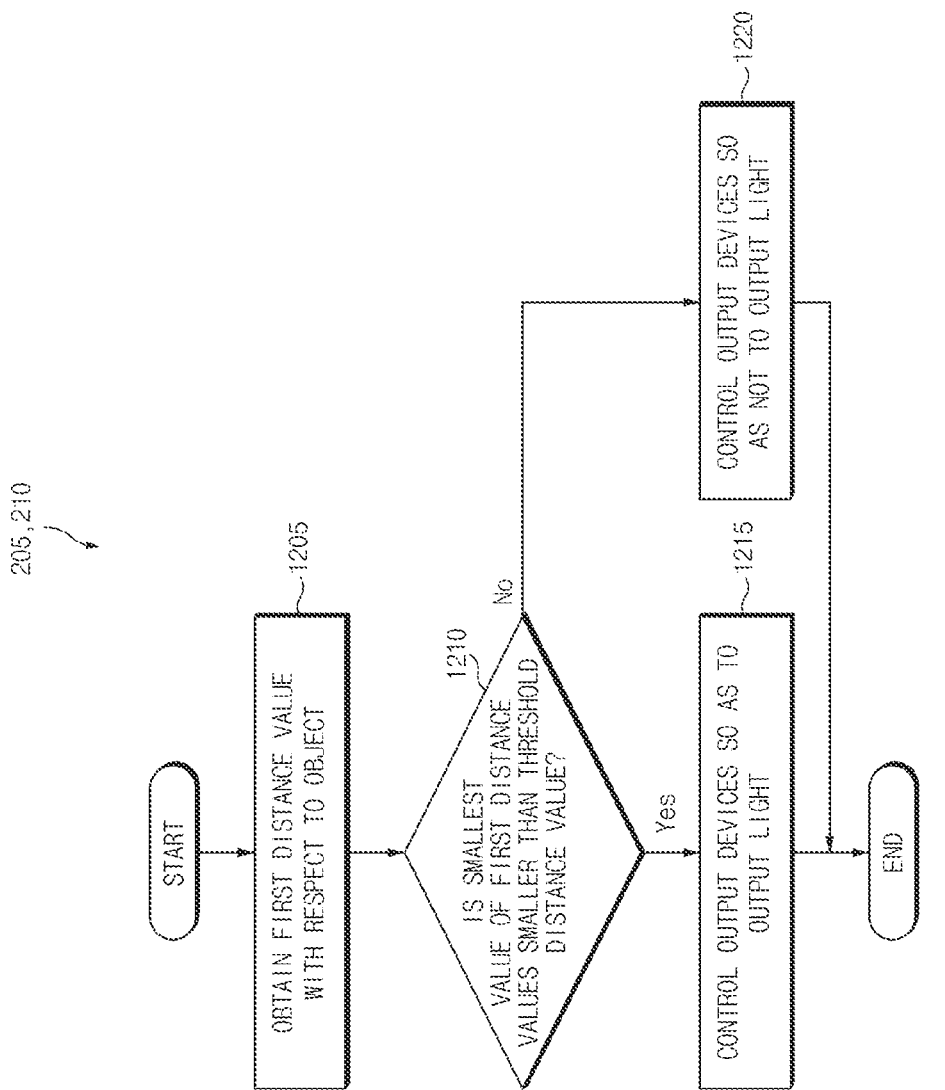
FIG. 12 is a flowchart of an operation of an electronic device that outputs light based on a distance value and a threshold distance, according to various embodiments.

FIG. 12 is a flowchart of an operation of the electronic device 101 that outputs light based on a distance value and the threshold distance 1110, according to various embodiments. Operations illustrated in FIG. 12 may mean operations performed by operations 205 and 210 of FIG. 2A in more detail.

Referring to FIG. 12, in operation 1205, the electronic device 101 may obtain a first distance value with respect to the object 200. For example, the electronic device 101 may obtain a first distance value between the electronic device 101 (or the plurality of output devices 110-1, 110-2, ..., 110-M) and the object 200. According to an embodiment, the electronic device 101 may obtain first distance values using UWB technology.

In operation 1210, the electronic device 101 may determine whether the smallest first distance value (e.g., 1105 of FIG. 11) of the first distance values is smaller than a threshold distance value. When the first distance values are smaller than the threshold distance value, the electronic device 101 may perform operation 1215. When the first distance values are larger than the threshold distance value, the electronic device 101 may perform operation 1220.

In operation 1215, the electronic device 101 may control the output devices so as to output light. For example, the electronic device 101 may output light through at least one output device including an output device having the smallest first distance value (e.g., 110-1 of FIG. 11). According to an embodiment, the electronic device 101 may transfer a feeling like the electronic device 101 welcomes the user by providing the flickering effect, the peripheral diffusion effect, or the sliding effect.

In operation 1220, the electronic device 101 may control the output devices so as not to output light. The electronic device 101 may control the plurality of output devices 110-1, 110-2, ..., 110-M so as not to output light.

Figure 13:
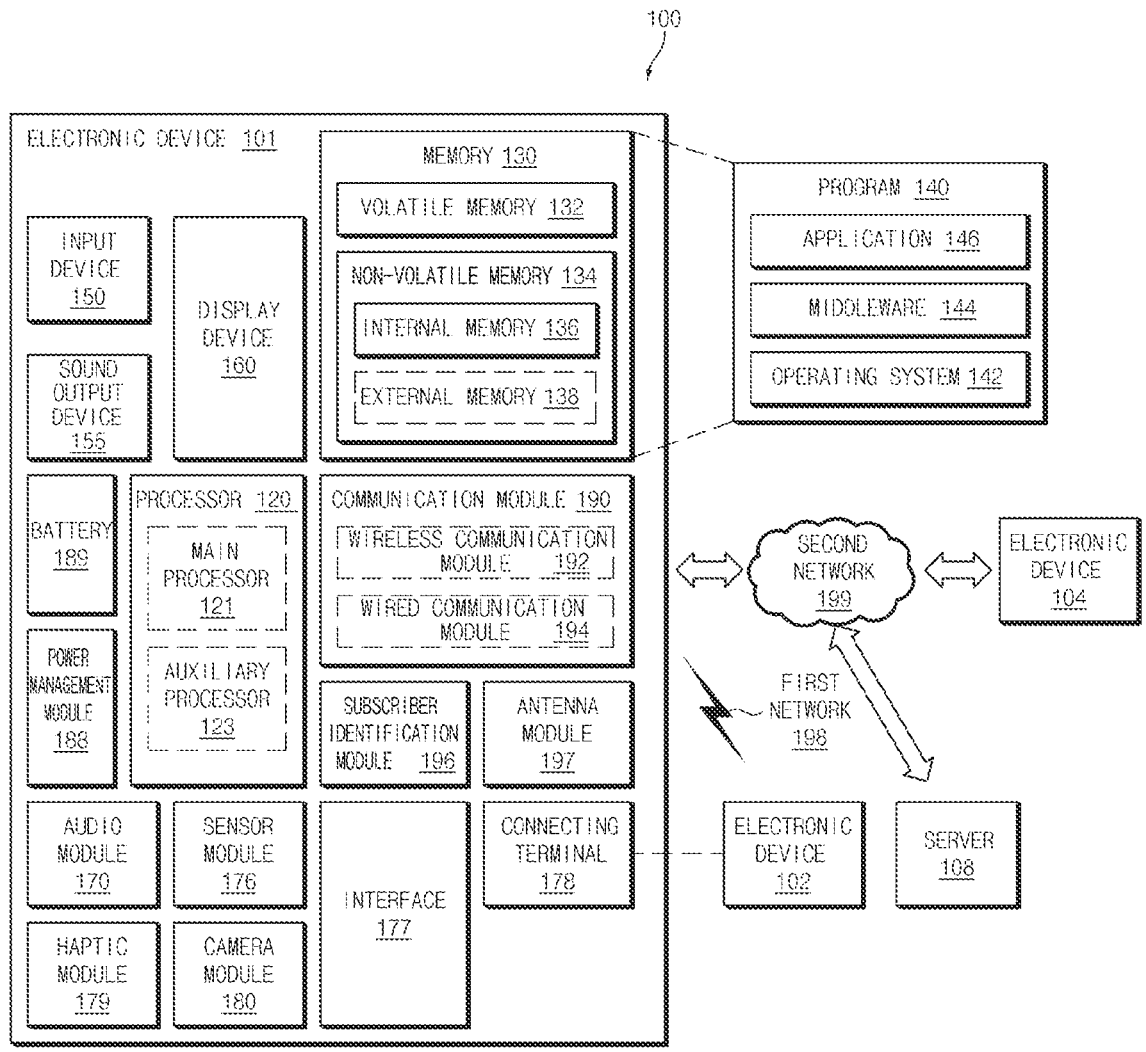
FIG. 13 is a block diagram of an electronic device in a network environment, providing a visual effect using a light emitting device based on a user's location, according to various embodiments.

FIG. 13 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto.

The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

According to various embodiments, an electronic device (e.g., the electronic device 101 of FIG. 3) may include a housing (e.g., the housing 105 of FIG. 3), a plurality of output devices (e.g., the output devices 110-1, 110-2, . . . , 110-M of FIG. 3) which are visually exposed through a part of the housing and disposed at different positions, at least one sensor (e.g., the sensor module 176 of FIG. 3) which is positioned in the housing and disposed at a position adjacent to the positions at which the plurality of output devices are disposed, and a processor (e.g., the processor 120 of FIG. 3) which is positioned in the housing and operatively connected to the plurality of output devices and the at least one sensor. The processor may obtain a plurality of first distance values between the plurality of output devices and an object through a first signal output using the at least one sensor, output light through at least one first output device selected from among the plurality of output devices, based on at least one first distance value belonging to distance values in a first specified range among the plurality of first distance values, detect movement of the object after the light is output, obtain a plurality of second distance values between the plurality of output devices and the object through a second signal output using the at least one sensor, in response to the movement being detected, and output light through at least one second output device selected from among the plurality of output devices, based on at least one second distance value belonging to values in a second specified range among the plurality of second distance values.

According to an embodiment, at least a portion of the housing may have a circular shape, straight-line shape, a triangular shape, a square shape, a rectangular shape, a polygonal shape, or an elliptical shape, and the plurality of output devices may be arranged to surround the housing at specified intervals.

According to an embodiment, the processor may control the plurality of output devices to increase a number of output devices that output light when the second distance value is smaller than the first distance value.

According to an embodiment, the processor may control the plurality of output devices to change a brightness or color of light output from the at least one output device based on at least one of the first distance value or the second distance value.

According to an embodiment, the processor may obtain a plurality of third distance values between the plurality of output devices and a second object through a third signal output from the at least one sensor, and output light through at least one third output device selected from among the plurality of output devices based on at least one third distance belonging to values in a third specified range among the plurality of third distance values, while light is output through the at least one second output device.

According to an embodiment, the processor may control the plurality of output devices such that a color of first light output from the at least one second output device and a color of the second light output from the at least one third output device are different from each other.

According to an embodiment, the processor may output third light having a color different from the color of the first light and the color of the second light through at least one output device that overlaps among the output devices including the at least one second output device and the at least one third output device.

According to an embodiment, the processor may control the plurality of output devices so as not to output light when the second distance values are larger than a threshold distance value.

According to various embodiments, an electronic device (e.g., the electronic device 101 of FIG. 3) may perform a method including obtaining a plurality of first distance values between a plurality of output devices included in the electronic device and an object (e.g., operation 205 of FIG. 2), outputting light through at least one first output device selected from among the plurality of output devices, based on at least one first distance value belonging to distance values in a first specified range among the plurality of first distance values (e.g., operation 210 of FIG. 2), obtaining a plurality of second distance values between the plurality of output devices and the object in response to a change in a position of the object after the light is output (e.g., operation 215 of FIG. 2), and outputting light through at least one second output device selected from among the plurality of output devices, based on at least one second distance value belonging to values in a second specified range among the plurality of second distance values (e.g., operation 220 of FIG. 2).

According to an embodiment, the outputting of the light through the at least one second output device may include controlling the plurality of output devices to increase a number of output devices that output light when the second distance value is smaller than the first distance value.

According to an embodiment, the outputting of the light through the at least one second output device may include controlling the plurality of output devices to change a brightness or color of light output from the at least one output device based on at least one of the first distance value and the second distance value.

According to an embodiment, the method of the electronic device may further include obtaining a plurality of third distance values between the plurality of output devices and a second object, and outputting light through at least one third output device selected from among the plurality of output devices based on at least one third distance belonging to values in a third specified range among the plurality of third distance values, while the light is output through the at least one second output device.

According to an embodiment, the outputting of the light through the at least one third output device may include controlling the plurality of output devices such that a color of first light output through the at least one second output device and a color of second light output through the at least one third output device are different from each other.

According to an embodiment, the outputting of the light through the at least one third output device may include outputting third light having a color different from the color of the first light and the color of the second light through output devices that overlap among the at least one second output device and the at least one third output device.

According to an embodiment, the method of the electronic device may further include controlling the plurality of output devices so as not to output light when the second distance values are larger than a threshold distance value.

According to various embodiments, an electronic device (e.g., the electronic device 101 of FIG. 3) may include a sensor (e.g., the sensor module 176 of FIG. 3), a plurality of light emitting devices (e.g., the output devices 110-1, 110-2, ..., 110-M of FIG. 3), and a processor (e.g., the processor 120 of FIG. 3). The processor may detect a distance and a direction with respect to an external object using the sensor, specify a first light emitting device group corresponding to the direction with respect to the external object among the plurality of light emitting devices according to the distance to the external object and output information related to the external object using the first light emitting device group based on at least the distance to the external object or the direction with respect to the external object.

According to an embodiment, the processor may detect a distance and a direction with respect to another external object that is specified using the sensor, specify a second light emitting device group corresponding to the direction with respect to the another external object among the plurality of light emitting devices according to the distance to the second external object and output information related to the another external object using one or more light emitting devices included in the second light emitting device group, based on at least the distance to the another external object or the direction with respect to the another external object.

According to an embodiment, one or more light emitting devices included in the first light emitting device group may be included in the second light emitting device group.

According to an embodiment, the processor may control at least one of the number of light emitting devices included in the first light emitting device group, a color of information related to the external object, or an output strength of information related to the external object according to the distance to the external object.

According to an embodiment, the sensor may support UWB technology and may be disposed in a position adjacent to the plurality of light emitting devices.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a housing;
   a plurality of output devices disposed at different positions and configured to be visually exposed through a portion of the housing;
   at least one sensor positioned in the housing and disposed at a position adjacent to the positions at which the plurality of output devices are disposed; and
   a processor positioned in the housing and operatively connected to the plurality of output devices and the at least one sensor, wherein the processor is configured to:
   obtain a plurality of first distance values through a first signal output using the at least one sensor, each first distance value of the plurality of first distance values representing a first distance between a corresponding one of the plurality of output devices and a first object at a first position;
   control output of light through at least one first output device selected from among the plurality of output devices, based on at least one first distance value belonging to distance values in a first specified range among the plurality of first distance values;
   detect movement of the first object from the first position to a different second position, after the light is output;
   obtain a plurality of second distance values through a second signal output using the at least one sensor, each second distance value of the plurality of second distance values representing a second distance between a corresponding one of the plurality of output devices and the first object at the second position, based on the movement being detected;
   control output of light through at least one second output device selected from among the plurality of output devices, based on at least one second distance value belonging to values in a second specified range among the plurality of second distance values;
   obtain a plurality of third distance values through a third signal output using the at least one sensor, each third distance value of the plurality of third distance values representing a third distance between a corresponding one of the plurality of output devices and a second object at a third position; and
   control output of light through at least one third output device selected from among the plurality of output devices, based on at least one third distance value belonging to values in a third specified range among the plurality of third distance values, while light is output through the at least one second output device,
   wherein the second object is different from the first object, and
   wherein the light output through the at least one second output device is output towards the first object and the light output through the at least one third device is output towards the second object.

2. The electronic device of claim 1, wherein the at least a portion of the housing has a circular shape, straight-line shape, a triangular shape, a square shape, a rectangular shape, a polygonal shape, or an elliptical shape, and
   wherein the plurality of output devices is arranged to surround the housing at specified intervals.

3. The electronic device of claim 1, wherein the processor is configured to control the plurality of output devices to increase a number of output devices that output light when the second distance value is smaller than the first distance value.

4. The electronic device of claim 1, wherein the processor is configured to control the plurality of output devices to change a brightness or color of light output from the at least one output device based on at least one of the first distance value or the second distance value.

5. The electronic device of claim 1, wherein the processor is configured to control the plurality of output devices such that a color of first light output from the at least one second output device and a color of the second light output from the at least one third output device are different from each other.

6. The electronic device of claim 5, wherein the processor is configured to control output of third light having a color different from the color of the first light and the color of the second light through at least one output device common to the at least one second output device and the at least one third output device.

7. The electronic device of claim 1, wherein the processor is configured to control the plurality of output devices so as not to output light when the second distance values are larger than a threshold distance value.

8. A method for an electronic device comprising:
   obtaining a plurality of first distance values between a plurality of output devices included in the electronic device and a first object, each first distance value of the plurality of first distance values representing a first distance between a corresponding one of the plurality of output devices and the first object at a first position;
   outputting light through at least one first output device selected from among the plurality of output devices, based on at least one first distance value belonging to distance values in a first specified range among the plurality of first distance values;

obtaining a plurality of second distance values, each second distance value of the plurality of second distance values representing a second distance between a corresponding one of the plurality of output devices and the first object at a second position different from the first position, based on a change in a position of the first object from the first position to the second position after the light is output;

outputting light through at least one second output device selected from among the plurality of output devices, based on at least one second distance value belonging to values in a second specified range among the plurality of second distance values;

obtaining a plurality of third distance values through a third signal output using the at least one sensor, each third distance value of the plurality of third distance values representing a third distance between a corresponding one of the plurality of output devices and a second object at a third position; and outputting light through at least one third output device selected from among the plurality of output devices, based on at least one third distance value belonging to values in a third specified range among the plurality of third distance values, while light is output through the at least one second output device, wherein the second object is different from the first object, and wherein the light output through the at least one second output device is output towards the first object and the light output through the at least one third device is output towards the second object.

9. The method of claim 8, wherein the outputting of the light through the at least one second output device includes controlling the plurality of output devices to increase a number of output devices that output light when the second distance value is smaller than the first distance value.

10. The method of claim 8, wherein the outputting of the light through the at least one second output device includes controlling the plurality of output devices to change a brightness or color of light output from the at least one output device based on at least one of the first distance value and the second distance value.

11. The method of claim 8, wherein the outputting of the light through the at least one third output device includes controlling the plurality of output devices such that a color of first light output through the at least one second output device and a color of second light output through the at least one third output device are different from each other.

12. The method of claim 11, wherein the outputting of the light through the at least one third output device includes outputting third light having a color different from the color of the first light and the color of the second light through output devices common to the at least one second output device and the at least one third output device.

13. The method of claim 8, further comprising:
controlling the plurality of output devices so as not to output light when the second distance values are larger than a threshold distance value.

* * * * *